(12) United States Patent
Stillinger (10) Patent No.: US 7,597,333 B2
(45) Date of Patent: Oct. 6, 2009

(54) BRAKE ASSEMBLY AND SCOOTERS AND SKATEBOARDS INCLUDING THE SAME

(75) Inventor: Scott H. Stillinger, Monte Sereno, CA (US)

(73) Assignee: Acorn Products, LLC, Monte Sereno, CA (US)

( * ) Notice: Subject to any disclaimer, the term of this patent is extended or adjusted under 35 U.S.C. 154(b) by 195 days.

(21) Appl. No.: 11/278,705

(22) Filed: Apr. 5, 2006

(65) Prior Publication Data

US 2007/0235970 A1     Oct. 11, 2007

(51) Int. Cl.
*B62M 1/00* (2006.01)

(52) U.S. Cl. .............................. 280/87.041; 280/87.01; 280/87.021

(58) Field of Classification Search .............. 280/87.01, 280/87.021, 87.03, 87.041, 87.042, 11.215, 280/828, 1.23, 1.186, 1.189
See application file for complete search history.

(56) References Cited

U.S. PATENT DOCUMENTS

| | | | | |
|---|---|---|---|---|
| 2,953,389 | A | | 9/1960 | Green et al. |
| 3,288,251 | A | * | 11/1966 | Sakwa .......................... 188/29 |
| 3,385,608 | A | | 5/1968 | Waddell |
| 3,862,763 | A | | 1/1975 | Ware |
| 3,945,655 | A | * | 3/1976 | Banks et al. ........... 280/11.215 |
| 4,003,582 | A | * | 1/1977 | Maurer ................... 280/11.215 |
| 4,027,890 | A | * | 6/1977 | Volkmann .............. 280/11.207 |
| 4,037,852 | A | | 7/1977 | Bayer et al. |
| 4,055,234 | A | * | 10/1977 | Burton ......................... 188/2 R |
| 4,084,831 | A | * | 4/1978 | Akonteh et al. ........ 280/11.215 |
| 4,088,334 | A | * | 5/1978 | Johnson ................. 280/11.206 |
| 4,166,519 | A | * | 9/1979 | Maloney ....................... 188/29 |
| 4,166,629 | A | | 9/1979 | List |
| 4,295,547 | A | | 10/1981 | Dungan |
| 4,775,162 | A | | 10/1988 | Chao |
| 4,951,958 | A | * | 8/1990 | Chao ..................... 280/87.041 |
| 5,263,725 | A | | 11/1993 | Gesmer et al. |
| 6,139,035 | A | | 10/2000 | Tsai |
| 6,213,484 | B1 | | 4/2001 | Rohner |
| 6,431,567 | B2 | | 8/2002 | Tsai |
| 6,481,728 | B2 | | 11/2002 | Chen |
| 6,481,729 | B2 | * | 11/2002 | Herman et al. ........... 280/87.05 |
| 6,488,296 | B2 | | 12/2002 | Ireton |
| 6,619,678 | B2 | * | 9/2003 | van Ardenne .......... 280/87.041 |
| 2002/0074756 | A1 | * | 6/2002 | Tsai ....................... 280/87.041 |

\* cited by examiner

*Primary Examiner*—Christopher P Ellis
*Assistant Examiner*—Katy Meyer
(74) *Attorney, Agent, or Firm*—Dascenzo Intellectual Property Law, P.C.

(57) ABSTRACT

Brake assemblies, and scooters and skateboards incorporating the same. The brake assemblies include an actuator that is positioned rearward of the body of the scooter or skateboard and includes a brake member that is selectively pivoted or otherwise moved into braking contact with a rear wheel assembly responsive to rider-applied braking inputs to the actuator. In some embodiments, the rear wheel assembly includes a truck with a chassis that is pivotally coupled to the body and to which the rear wheels are rotatably mounted. In some embodiments, the brake member is adapted to apply braking forces to a ground-contacting surface of at least one of the rear wheels responsive to braking inputs applied by a rider to the actuator. In some embodiments, the brake assembly is configured to maintain its orientation relative to the rear wheel regardless of the pivotal orientation of the body relative to the chassis.

22 Claims, 5 Drawing Sheets

BRAKE ASSEMBLY AND SCOOTERS AND SKATEBOARDS INCLUDING THE SAME

FIELD OF THE DISCLOSURE

The present disclosure is directed generally to scooters and skateboards, and more particularly to improved brake assemblies for use therewith.

BACKGROUND OF THE DISCLOSURE

Scooters and skateboards typically include a deck, or riding surface, upon which a rider stands. Scooters include a handle that extends upwardly relative to the deck and which may assist in the rider steering the scooter. Skateboards do not include such a projecting handle. The devices are typically manually propelled by the rider, with the propulsion being provided by a rider pushing against a ground surface with one of the rider's feet while standing on the deck with the other foot. Scooters and skateboards further include forward and rear wheel assemblies. Some scooters and skateboards do not include a brake mechanism. Others include brake mechanisms that are actuated by a rider's hands or feet. A concern with brake mechanisms is whether they are properly positioned to engage at least one of the scooter's or skateboard's wheels while also not interfering with the use of the scooter or skateboard. Accordingly, a recurring design consideration is the placement and orientation of the brake mechanism's actuator relative to the other components of the scooter or skateboard.

SUMMARY OF THE DISCLOSURE

The present disclosure is directed to scooters and skateboards that include a manually actuated brake assembly adapted to apply braking forces to a rear wheel assembly of the scooter or skateboard. The brake assembly includes an actuator that is positioned rearward of the deck, foot board, or other riding surface of the body of the scooter or skateboard. The brake assembly further includes a brake member that is selectively moved into braking contact with the scooter's rear wheel assembly responsive to rider-applied braking inputs to the actuator. In some embodiments, the rear wheel assembly includes a truck with a chassis, or pivot member, that is pivotally coupled to the body and to which the rear wheels are rotatably mounted. In some embodiments, the brake member is adapted to apply braking forces to a ground-contacting surface of at least one of the rear wheels responsive to braking inputs applied by a rider to the actuator. In some embodiments, the brake assembly is adapted to maintain its orientation relative to the rear wheel(s) that selectively receive braking forces therefrom regardless of the pivotal orientation of the body relative to the chassis. In some embodiments, the brake assembly is pivotally coupled to the chassis, and in some embodiments the chassis defines a pivot axis that extends through, or at least proximate to, the actuator at least when the brake assembly is in an unactuated configuration.

DETAILED DESCRIPTION AND BEST MODE OF THE DISCLOSURE

Figures 1, 2:
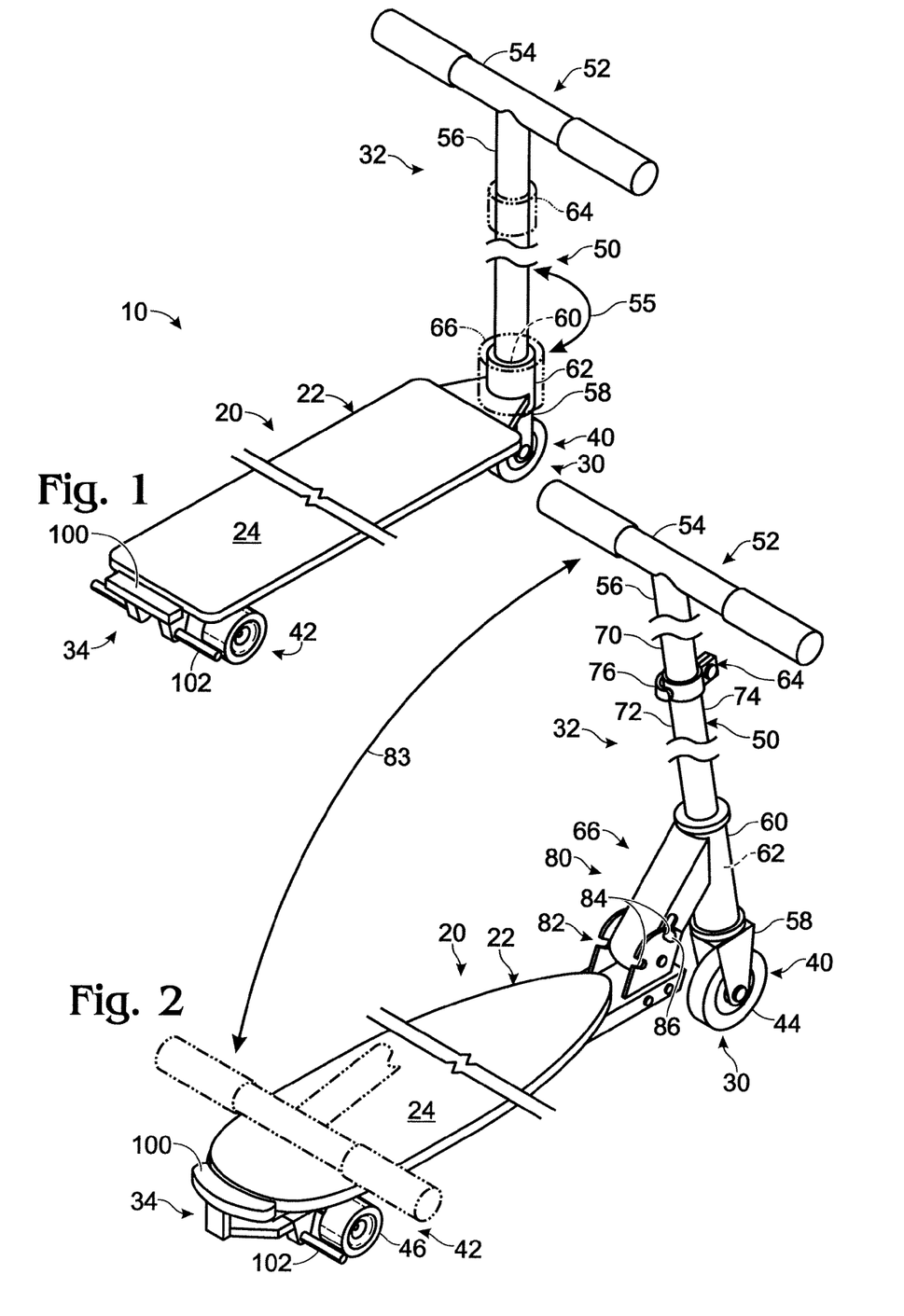
FIG. 1 is an isometric view of a scooter with a brake assembly according to the present disclosure.
FIG. 2 is an isometric view of another illustrative example of a scooter with a brake assembly according to the present disclosure.

An illustrative, non-exclusive example of a scooter having a brake assembly according to the present disclosure is somewhat schematically illustrated at 10 in FIG. 1. Scooter 10 includes a body, or frame, 20 that includes a rider platform 22 that defines a riding surface 24 upon which a rider stands when using the scooter. The rider may be a child or an adult, and the scooter's body may be sized and dimensioned for use by a particular size of rider. Generally, both of a rider's feet are supported on the riding platform during some use of the scooter, such as when coasting, while at other times one of the rider's feet is supported on the riding surface while the other foot is used to propel the scooter against a ground surface. The relative length and width of the rider platform, as well as the construction of body 20, may vary without departing from the scope of the present disclosure. The rider platform may be, but is not required to be, partially, or even completely, coextensive with the upper surface of the scooter's body. As an illustrative, non-exclusive example, it is within the scope of the present disclosure that the rider platform may be coextensive with at least the rear region of the upper surface of the scooter's body.

In addition to body 20, scooters 10 according to the present disclosure include a wheel assembly 30, a steering assembly 32, and a brake assembly 34. As indicated in connection with the illustrative example of a scooter 10 shown in FIG. 1, wheel assembly 30 includes at least a front wheel assembly 40 and a rear wheel assembly 42. Each wheel assembly includes at least one wheel that is configured for rotational movement relative to the rider platform of the scooter. In some embodiments, either or both of the front wheel assembly and the rear wheel assembly may include two or more wheels. It is within the scope of the present disclosure that at least one of the plurality of wheels of the wheel assembly is adapted to be steered responsive to steering inputs to the steering assembly from a rider standing on rider platform 22. Although not required to all embodiments, it is also within the scope of the present disclosure that at least one of the plurality of wheels of the wheel assembly is adapted to be steered responsive to steering inputs to rider platform 22 itself. Illustrative, non-exclusive examples of such a pivotal configuration for wheels for scooter 10 include wheels that are coupled to the body by trucks, or truck assemblies, such as are used on skateboards.

In such an embodiment, tilting of the rider platform results in steering inputs to the corresponding wheels of the scooter's wheel assembly.

Steering assembly 32 is adapted to convey steering inputs from a rider standing on platform 22 to at least front wheel assembly 40. In some embodiments, the steering assembly may include a rotatable steering column that is coupled to the front wheel assembly so that rotating of the steering column relative to the body of the scooter results in a corresponding pivoting, or steering, of the front wheel assembly to provide steering inputs thereto. In other embodiments, scooter 10 may include a steering column and associated handle bars or other steering mechanisms that are not directly coupled to the front wheel assembly and which instead are not configured to directly provide steering inputs to the front wheel assembly responsive to pivoting of the steering column relative to the body of the scooter.

The scooter 10 of FIG. 1 provides an illustrative graphical example of a steering assembly 32 that includes a steering column 50 that is coupled for rotational movement relative to the body of the scooter about a generally vertical axis. The steering assembly includes a steering mechanism 52, such as handlebars 54, to which steering inputs are imparted to the steering assembly by a rider standing on rider platform 22. Although the illustrated handlebars include a pair of opposed handles that are positioned to be gripped by a rider standing on the scooter's rider platform, it is within the scope of the present disclosure that the handlebars or other steering mechanism 52 may have any suitable configuration. The steering assembly is coupled, via any suitable mechanism, to front wheel assembly 40 so that the steering inputs are conveyed to the front wheel assembly to steer the front wheel assembly, i.e., pivot the wheel(s) of the front wheel assembly about a steering axis to change the path, or direction, along which the scooter is oriented.

The steering axis of the front wheel assembly may extend along the long axis of the steering column, although this is not required to all embodiments. In FIG. 1, the front wheel assembly is shown being configured to be steered, or pivoted, about a generally vertical steering axis, with the pivotal path being indicated generally at 55. As an illustrative, non-exclusive example, the steering mechanism may be connected to one end region 56 of the steering column, and the front wheel assembly may be connected to an opposed end region 58 of the steering column, with an intermediate region 60 of the steering column being coupled for rotational movement about a generally vertical axis relative to the body of the scooter. As an illustrative, non-exclusive example, an intermediate region of the steering column may be journaled, or otherwise rotatably received, in a bearing portion 62 of the body of the scooter, as indicated in dashed lines in FIG. 1.

Although not required to all scooters according to the present disclosure, it is within the scope of the present disclosure that scooters 10 may include a steering assembly that is adjustable and/or collapsible relative to the body of the scooter. As an illustrative, non-exclusive example, steering column 50 may be selectively adjustable in length, such as via an adjustment mechanism 64 that selectively secures telescoping members of the steering column in a selected orientation to define an adjustable length, or height, of the steering column. Expressed in slightly different terms, the steering assembly may optionally include an adjustment mechanism, such as is schematically illustrated in FIG. 1, that is configured to selectively enable adjustment of the distance between the steering mechanism and the front wheel assembly (and/or the rider platform). It is also within the scope of the present disclosure that scooter 10 may, but is not required to, include a stowage mechanism 66 that is adapted to retain the steering column in a generally upright "use" configuration, such as shown in FIG. 1, and to selectively release the steering column to pivot to a collapsed configuration, in which the steering mechanism and corresponding portion of the steering column is pivoted toward the body of the scooter.

In the somewhat schematic example of a scooter 10 shown in FIG. 1, the front wheel assembly extends forward of the scooter's body. This configuration is not required to all embodiments. As used herein, a variety of relative terms are used to refer to orientations of portions of scooters 10. The front, or front portion, of the scooter will refer to the portion proximate the steering column, while the rear, or rear portion, will refer to the portion proximate the brake assembly. Similarly, the terms horizontal and vertical will generally refer to the relative orientation of portions of the scooter when the scooter is positioned in an upright orientation on a level, flat surface.

Brake assembly 34 is adapted to apply braking forces to at least one wheel of the rear wheel assembly. The brake assembly includes at least an actuator 100, which is adapted to receive braking inputs from a rider standing on rider platform 22, and a brake member, or engagement member 102, which is adapted to selectively engage at least a portion of the rear wheel assembly to apply braking forces thereto responsive to the braking inputs received by actuator 100. For example, the brake member may be positioned to selectively engage at least one rear wheel of the rear wheel assembly to apply braking forces thereto. As discussed in more detail herein, actuator 100 is preferably positioned for actuation by a rider's foot, with the actuator being positioned so that it does not obstruct the rider platform of the scooter, such as with the actuator being positioned rearward of the scooter's rider platform and (in some embodiments) the entirety of the scooter's body.

Another illustrative, non-exclusive example of a scooter 10 according to the present disclosure is shown in FIG. 2. In the illustrative example shown in FIG. 2, scooter 10 includes a wheel assembly 30 that includes a front wheel assembly 40 having a single front wheel 44, and a rear wheel assembly 42 that includes a pair of rear wheels 46. Like the other scooters 10 described and/or illustrated herein, scooter 10 includes a body 20 with a rider platform 22 that defines a riding surface 24, a steering assembly 32, and a brake assembly 34.

The illustrated scooter also provides less schematic examples of an optional adjustment mechanism 64 for the height of the steering column and an optional stowage mechanism 66 to permit the steering column to be pivoted from an upright configuration to a stowed configuration. As shown, adjustment mechanism 64 selectively retains telescoping members 70 and 72 of the steering column to define the length of the steering column and thereby adjust the height of the steering mechanism (such as relative to the rider platform). The adjustment mechanism in the illustrative, non-exclusive example shown in FIG. 2 includes a collar 74 that is selectively tightened or loosened (i.e., decreased or increased in diameter) to respectively secure or release the telescoping members in a selected relative position. Any suitable fastener 76 may be used to selectively tighten or loosen the collar, such as a threaded fastener and/or a cam mechanism. As another example, the adjustment mechanism may utilize a fastening mechanism, such as a pin, screw, spring-biased projection, that selectively retains the telescoping members in a selected orientation without requiring the use of a collar to provide this retention.

The illustrative, non-exclusive example of a suitable stowage mechanism 66 shown in FIG. 2 includes a pivotal linkage 80 that enables selective pivotal adjustment of the steering assembly relative to the riding surface 24 of the scooter's body about a generally horizontal axis. This pivotal adjustment may additionally or alternatively be described as being within a plane that extends through the long axes of the riding surface and the steering column. The stowage mechanism further includes a retainer assembly 82 that selectively retains the steering column in a selected one of a plurality of configurations, with the plurality of configurations including at least a use, or upright, configuration and a stowed, or collapsed, configuration.

In FIG. 2, an illustrative example of a use configuration for the steering assembly is shown in solid lines, an illustrative example of a stowed configuration is shown in dashed lines, and an illustrative pivotal path for the steering assembly between these configurations is indicated at 83. The use configuration refers to a configuration in which the steering column projects generally normal, or transverse, to a ground surface upon which the scooter is used, with the front wheel assembly in engagement with the ground surface and thereby positioned to steer the scooter. It is within the scope of the present disclosure that the stowage mechanism may define more than one use configuration (such as a use configuration in which the steering column projects at an angle other than 90° relative to the rider platform of the scooter), and that the stowage mechanism may enable a user to select and retain the steering assembly in a selected one of the use configurations and/or a selected position within a range of positions. In the stowed configuration, the steering assembly may extend generally parallel to the rider platform, and the steering assembly may engage the rider platform. However, this illustrative relative orientation is not required to all embodiments. For example, and as indicated in dashed lines in FIG. 2, the degree to which the steering column, and optionally the front wheel assembly, are pivoted or otherwise collapsed toward the rider platform to a stowed configuration depends at least in part upon the construction of the stowage mechanism.

The stowage mechanism may utilize any suitable structure or mechanism to retain the steering assembly in a selected one of the plurality of configurations and to selectively release the steering assembly for movement to another selected one of the plurality of configurations. In the illustrative, non-exclusive example shown in FIG. 2, the retainer assembly includes a plurality of detents, or sockets, 84 on body 20, and a releasable pawl, or brace, 86 that is selectively engaged with detents to retain the steering assembly in a selected configuration relative to the rider platform. The retainer assembly, when present, may optionally include a release member to assist in disengaging the pawl from a selected detent and/or at least one of a lock member and a biasing mechanism to prevent the unintentional disengagement of the pawl from a selected detent. An illustrative, non-exclusive example of a suitable stowage mechanism 66 is disclosed in U.S. Pat. No. 6,431,567, the complete disclosure of which is hereby incorporated by reference for all purposes.

Figure 3:
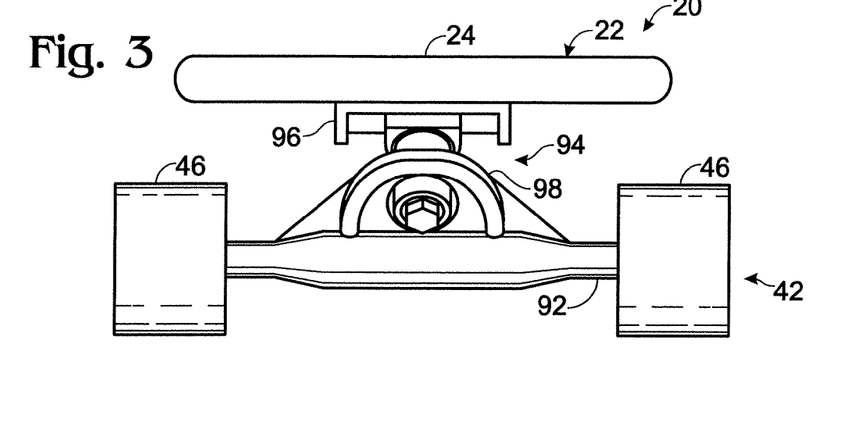
FIG. 3 is a rear elevation view of an illustrative rear wheel assembly that may be used with brake assemblies according to the present disclosure.

As discussed previously, it is within the scope of the present disclosure that at least one of the scooter's front and rear wheel assemblies may include a pair of wheels that are suitably coupled for pivotal and rotational movement relative to the body of the scooter. More specifically, the wheels are rotatably coupled for movement with, or about, one or more axles, with the wheels and axle(s) pivotally coupled for movement relative to the body of the scooter. An illustrative, non-exclusive example of a suitable mechanism is a truck, or truck assembly, such as is conventionally utilized on skateboards. As perhaps best seen in FIG. 3, an illustrative, non-exclusive example of a suitable construction for a rear wheel assembly that includes a pair of truck-mounted wheels is shown. For the purpose of simplifying FIG. 3, other components of a scooter 10 according to the present disclosure have not been illustrated in FIG. 3 and in subsequently described FIG. 4. Rear wheel assembly 42 is depicted in FIG. 3 with a pair of wheels 46 mounted for rotational movement with (or alternatively about) an axle, or axle assembly, 92. Axle assembly 92 is nominally aligned transverse to the long, or longitudinal, axis of the rider platform of the scooter's body. Axle assembly 92 is coupled for pivotal movement relative to the rider platform 22 of the body 20 of the scooter by a suitable mechanism.

Figure 4:
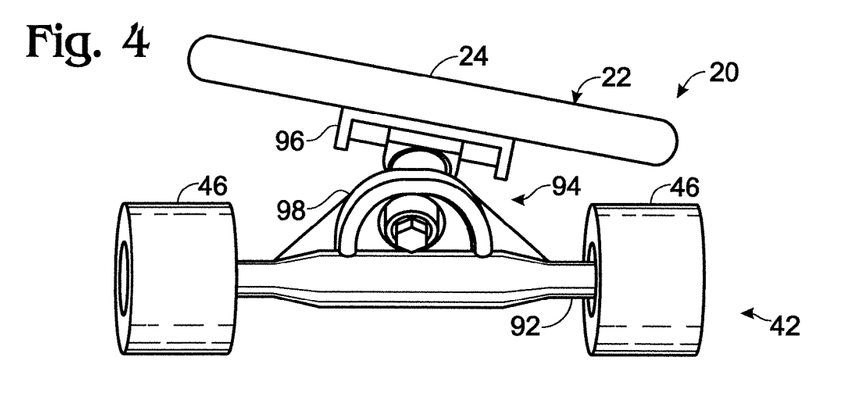
FIG. 4 is a rear elevation view of the rear wheel assembly of FIG. 3 in a tilted, or turning, configuration.

In the illustrative example, a truck is indicated at 94 and includes a mount 96 that is secured in a fixed orientation relative to the body of the scooter, and a pivot member 98 that pivotally interconnects the mount and the axle assembly. Pivot member 98 may additionally or alternatively be referred to as a chassis, or truck chassis, herein. When a rider standing on rider platform 22 leans laterally or otherwise shifts the rider's weight transverse to the long axis of the rider platform, the body of scooter 10 pivots relative to the rear wheel assembly, such as shown in FIG. 4. The truck assembly defines a pivot axis about which the pivot member and body of the scooter are pivotally coupled. The pivot axis of the truck assembly may also be referred to as a steering axis for the rear wheel assembly, as tilting of the scooter's body relative to the truck assembly chassis during ground-traveling movement of the scooter results in a responsive movement of the chassis, or pivot member, about the steering axis. It is within the scope of the present disclosure that the degree of force required to tilt the body relative to the rear wheel assembly may be adjustable, that the pivotal movement of the rider platform relative to the rear wheel assembly may be dampened, and/or that the truck may be biased to return the body to a horizontal, or level, orientation relative to the axle assembly. Illustrative, non-exclusive examples of suitable trucks (and/or wheel mounting mechanisms) and steering assemblies are disclosed in U.S. Pat. Nos. 5,263,725, 4,166,629, 4,084,831, 4,003,582, and 3,862,763, the complete disclosures of which are hereby incorporated by reference for all purposes.

The scooter of FIG. 2 also provides another illustrative example of a brake assembly 34 according to the present disclosure. Similar to the brake assembly of FIG. 1, the brake assembly includes at least an actuator 100 and a brake member 102. As discussed, actuator 100 is positioned rearward of body 20 and positioned or otherwise adapted to receive braking inputs from a rider standing on rider platform 22 (via the rider's foot pressing against the actuator). As also discussed, brake member 102 is positioned or otherwise adapted to selectively engage at least a portion of the scooter's rear wheel assembly, such as rear wheels 46, to apply braking forces thereto responsive to braking inputs applied by the user to actuator 100.

Figure 5:
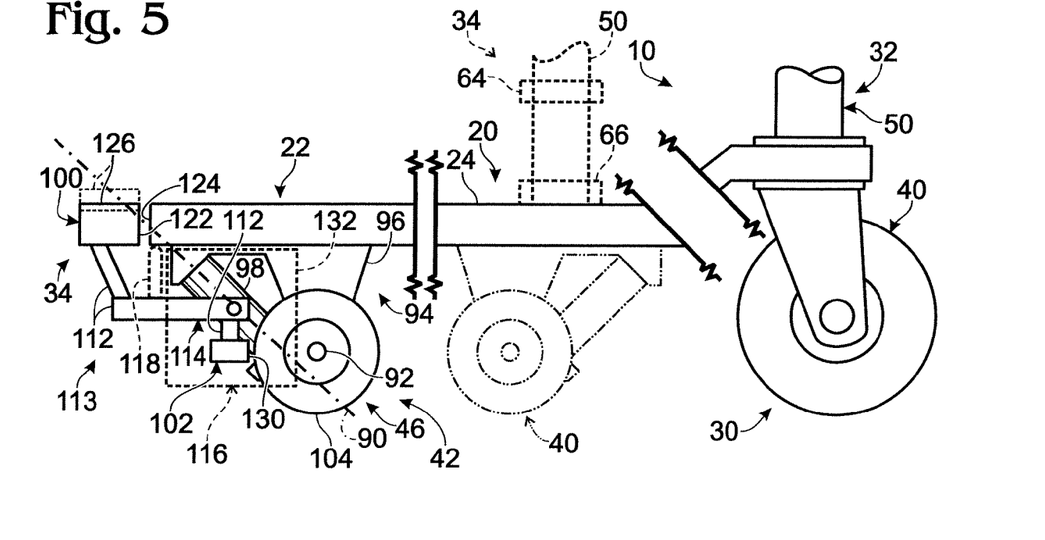
FIG. 5 is a fragmentary side elevation view schematically illustrating portions of a scooter with a brake assembly according to the present disclosure.

A brake assembly 34 according to the present disclosure is schematically illustrated in FIG. 5. As discussed previously, brake assembly 34 includes an actuator 100 and a brake member 102 that applies braking forces to the rear wheel assembly responsive to rider-imparted braking inputs to the actuator. In the following discussion, the brake member will be described as being adapted to engage the outer, or ground-contacting, surface 104 of at least one of the rear wheels 46 of rear wheel assembly 42. It is within the scope of the present disclosure that the brake member may additionally or alternatively be adapted to apply braking forces to another portion, or portions, of the rear wheel assembly. The other portion, or portions, when utilized, may similarly be described as having engagement surface(s) that are selectively engaged by the brake member.

In the somewhat schematically illustrative example of a brake assembly 34 shown in FIG. 5, it is also demonstrated that brake assemblies 34 according to the present disclosure may (but are not required in all embodiments to) include a biasing mechanism 116 that is configured to urge the brake member away from contact with the rear wheels (or other portion of the rear wheel assembly that the brake member is configured to apply braking forces to upon receipt of braking inputs to the actuator). As also schematically illustrated in FIG. 5, brake assemblies 34 according to the present disclosure may (but are not required in all embodiments to) include a stop, or pivot restrictor, 118 that defines the extent to which the actuator may be urged away from the rear wheels, such as by the biasing mechanism, and/or which defines (at least in part) the distance between the brake member 102 of the brake assembly and the rear wheel(s) to be braked when the brake assembly is in its unactuated configuration.

Actuator 100 is positioned rearward of the rider platform 22 of the scooter's body 20. As illustrated in FIG. 5, the forward surface 122 of the actuator is positioned rearward of the corresponding rearward surface 124 of the scooter's body. Actuator 100 may be described as being accessible by a rider standing on the scooter's rider platform, such as responsive to the rider pressing upon the actuator with one of the rider's feet, with the actuator not obstructing or extending above the rider platform, or optionally any portion of the body of the scooter. Accordingly, scooters with brake assemblies 34 according to the present disclosure may be described as having rider platforms (and optionally scooter bodies) that are unencumbered, or not obstructed by, the actuator for the brake assembly.

In the illustrated, non-exclusive example shown in FIG. 5, the forward surface of the actuator is positioned in a spaced-apart relationship with the opposed rearward surface of the body of the scooter. It is within the scope of the present disclosure that the distances between these surfaces may vary, including distances that are greater or lesser than the illustrated example, including embodiments in which the surfaces are in contact with each other when the actuator is in its unactuated, or idle, configuration. At least the forward surface of the actuator may be shaped to generally correspond to the shape of the rearward surface of the scooter's body, although this is not required. In some embodiments, the forward surface of the actuator may have a smooth, or even planar configuration, while in others it may have a grooved, irregular, undulating, or other suitable configuration. The actuator may have any suitable, length, width, and other dimensions. In some embodiments, it may be desirable for at least the upper surface of the actuator to be positioned so that the pivot axis of the truck extends through, or at least proximate, this upper surface at least prior to when the rider depresses the actuator.

As illustrated in FIG. 5, the actuator includes an upper surface 126 that is aligned with, or generally coplanar with, the riding surface 24 of the rider platform 22 of the scooter's body. However, and as indicated in dashed lines in FIG. 5, it is within the scope of the present disclosure that the upper, or foot-contacting, surface of the actuator may be either lower than or higher than the riding surface of the body's rider platform prior to braking inputs being applied thereto by a rider's foot.

In some embodiments, it may be desirable for the upper surface of the actuator to be positioned higher than the riding surface so that a rider's foot may be slid backward from the riding surface and into engagement with the forward surface of the actuator to indicate the position of the actuator to the rider without the rider having to look down to position his or her foot relative to the actuator. In some embodiments, it may be desirable to have the actuator positioned level with or even below the riding surface of the rider platform, such as to provide a smooth transition between the riding surface and the upper surface of the actuator and/or to position the upper surface to require the rider to positively urge the rider's foot to extend beneath a plane defined by the riding surface in order to engage the upper surface of the actuator. It is similarly within the scope of the present disclosure that the relative, unactuated, height of the actuator with respect to the riding surface may be adjustable. For example, one or more of the subsequently discussed linkage structures may be adjustable, the actuator may be designed to be removed and replaced, such as with a differently sized actuator having an upper surface that will correspondingly be positioned at a different height than the removed actuator, and/or the brake assembly may include an adjustable stop 118 that correspondingly permits adjustment of the unactuated height of the actuator relative to the rider platform of the scooter's body and/or the distance between the brake member and rear wheel(s) of the rear wheel assembly when the brake assembly is in its unactuated configuration.

Accordingly, the actuator may be described as having at least a first, or unactuated, configuration when the rider is not pressing upon the actuator to apply braking inputs thereto, and a second, or braking, configuration, in which the actuator is displaced by the rider-imparted braking inputs away from the first configuration and generally downwardly away from riding surface of the scooter's body. As discussed in more detail subsequently, because the actuator and brake member are configured for at least relative responsive movement, if not movement as a unit, the brake member and the brake assembly may also be described as having at least a first (or unactuated) configuration, when the rider is not depressing the actuator, and a second, or braking, configuration, when braking forces are applied by the brake member.

Brake member 102 and actuator 100 are coupled for movement as a unit, or at least relative responsive movement. Accordingly, the brake member may also be described as being selectively moved between unactuated and braking configurations, with the actuator and brake member being suitably coupled for movement between these positions, such as in a pivotal, sliding, translational, or other suitable movement path. This linkage between the actuator and brake member may be a direct linkage between these components of the brake assembly, including (but not limited to) having the components be integrally formed or otherwise permanently connected. Alternatively, the components may be releasably secured together and/or coupled together by one or more linkage structures, such as schematically illustrated at 112 in FIG. 5. The linkage structure(s) include a linkage structure 114 that couples the brake assembly for movement as a unit with the pivot member 98 of the truck 94 that couples the rear wheels 46 to the body of the scooter. The brake assembly may additionally or alternatively be described as including a brake assembly body, or frame, 113 that includes, or is coupled to, actuator 100 and brake member 102.

Additionally or alternatively, brake assemblies 34 according to the present disclosure may be described as not being directly mounted to the rider platform of the scooter. Instead, the brake assemblies are configured so that the rider platform may tilt, or pivot, relative to the rear wheels of the scooter without affecting the orientation of the brake assembly relative to the rear wheel assembly, and more particularly, without affecting the orientation of brake member 102 with the corresponding engagement surface 104. Therefore, while the relative position of a portion of the rider platform of the scooter may change relative to the rear wheels, the brake assembly remains at a defined position where it is positioned to apply braking forces to the rear wheels (and/or other portion of the rear wheel assembly) responsive to rider-imparted braking inputs to the actuator.

As discussed, truck-mounted wheel assemblies, such as may be utilized for rear wheel assembly 42, define a steering axis about which the chassis, or pivot member, 98 of the truck pivots relative to the body of the scooter, such as responsive to lateral tilting of the rider platform. In FIG. 5, an illustrative example of a steering axis is indicated at 90. As illustrated, the steering axis extends through the upper surface 126 of actuator 100. While not required to all scooters 10 according to the present disclosure, in some embodiments it may be desirable for the brake assembly to be coupled to the body of the scooter such that the steering, or pivot, axis of the rear wheel assembly extends through at least the upper surface of the actuator when the actuator is in its unactuated configuration. This relative positioning may restrict horizontal movement of the actuator as the body of the scooter is tilted relative to the rear wheel assembly. However, actuators that are not intersected by a steering axis of the rear wheel assembly when the actuators are in unactuated configurations are also within the scope of the present disclosure. In embodiments where at least the upper surface of the actuator is intersected by the pivot axis of truck 94, the path of movement of the brake assembly between its unactuated and braking configurations may, but is not required to, define a plane along which the pivot axis extends.

Brake member 102 is positioned to engage at least one wheel of the scooter's rear wheel assembly to apply braking forces thereto. It is within the scope of the present disclosure that brake assemblies 34 may include more than one brake member, and/or may selectively apply braking forces to one or more wheels of the rear wheel assembly. As illustrative, non-exclusive examples of particular embodiments, brake assemblies 34 may include a single brake member that selectively engages a single rear wheel of the rear wheel assembly, a single brake member that selectively engages two rear wheels of the rear wheel assembly, at least a pair of brake members that selectively engage a single rear wheel of the rear wheel assembly, or at least a pair of brake members that selectively engage two rear wheels of the rear wheel assembly.

The brake member includes a contact surface, or region, 130 that is positioned for engagement of the engagement surface of the rear wheel(s) to apply braking forces thereto responsive to braking inputs being applied to the actuator. The contact surface may be an integral, or permanently affixed, portion of the brake member. Alternatively, at least the contact surface, and optionally additional portions or even the entirety of the brake member, may be designed to be selectively and repeatedly removed and replaced, such as to permit replacement for wear or if damaged, and/or for replacement depending upon such illustrative factors as one or more of rider preferences, rider weight, riding style, terrain to be covered, wheel shape, wheel size, wheel material, wheel construction, etc. The brake member may accordingly be constructed from any suitable material to apply the desired braking forces to the rear wheels being used in the rear wheel assembly. Illustrative, non-exclusive examples include durable plastic, rubber and/or metal contact surfaces, although in some embodiments it may be desirable to have softer contact surfaces that may wear to a greater extent during use. It is within the scope of the present disclosure that the brake member may have a contact surface in the form of a removable brake pad, although this construction is not required to all embodiments. In other embodiments, the brake member may be a monolithic structure that is permanently or removably coupled to the rest of the brake assembly.

As discussed, the contact surface, or region, 130 of brake member 102 is positioned to engage the engagement surface 104 of the corresponding rear wheel(s). In some embodiments, the brake member may be positioned so that it engages the engagement surface in a non-binding orientation, or non-binding manner. By this it is meant that the force of the rotating wheel will urge the brake member out of engagement with the wheel, thereby requiring positive application of braking inputs by the rider to continue braking of the scooter. In such an embodiment, the force of the rotating wheel engaging with the brake member and/or the restoring force exerted by the biasing mechanism will interrupt the application of braking forces to the rear wheel(s) when the rider releases the actuator to return from its braking configuration toward its unactuated configuration. However, this construction is not required to all embodiments.

Biasing mechanism 116 is adapted to urge the brake assembly to pivot or otherwise move from its braking configuration, in which the engagement region, or surface, of the brake member is applying braking forces to one or more wheels of the rear wheel assembly, toward its unactuated, or idle, configuration. In addition to urging the brake member out of engagement with the rear wheel(s), the biasing mechanism may (but is not required to) apply biasing forces to the brake assembly to prevent the brake member from engaging the rear wheel(s) other than when a rider applies the previously discussed braking inputs to the actuator. For example, the biasing mechanism may be adapted to restrict forces imparted to the scooter during normal ground-traveling use of the scooter from unintentionally causing braking forces to be imparted to the rear wheel assembly by the brake member. The biasing mechanism is schematically illustrated in FIG. 5 to graphically indicate that the biasing mechanism may be constructed to apply this biasing force to any suitable portion of the brake member. The biasing mechanism may include one or more biasing members 132, such as any suitable spring (extension, compression, torsion, leaf, etc.), resilient compressible member, resilient deflectable member, elastic member, etc. In some embodiments, the biasing mechanism may be coupled between the truck of the rear wheel assembly and one or more portions of the brake assembly, and in some embodiments, the biasing mechanism may be partially, or completely, housed internal of the truck and adapted to apply the biasing forces to the pivotal linkage between the truck and the brake assembly. However, other constructions are within the scope of the present disclosure and the above examples are intended merely to be illustrative, non-exclusive examples.

Stop, or pivot restrictor, 118, when present, is adapted to limit, or define an upward extent to which the brake member may be moved or otherwise urged away from the corresponding engagement surface of the rear wheel assembly. As discussed, the brake member and actuator are configured for relative movement as a unit. Accordingly, the stop may additionally or alternatively be described as defining the relative position of the upper surface of the actuator relative to the riding surface of the scooter's rider platform when the brake assembly is in its unactuated configuration. As a further variant, stop 118 may additionally or alternatively be described in some embodiments as defining the distance between brake member 102 and a corresponding rear wheel of the rear wheel assembly when the brake assembly is in an unactuated configuration.

Stop 118 is schematically illustrated in FIG. 5 and may include any suitable structure for accomplishing either or both of the above optional purposes. As illustrative, non-exclusive examples, the stop may extend from the body of the scooter to selectively engage the brake member and thereby limit the extent to which it may be pivoted or otherwise moved away from the rear wheels. As another example, the stop may extend from, or form a portion of, the brake member and may be positioned to engage the body of the scooter to limit the extent to which the brake member may be pivoted or otherwise moved away from the rear wheels. Stop 118 may be implemented as a single member, or as two or more members. Stop 118 may be adjustable and/or designed to be selectively removed and replaced relative to the rest of the scooter. When stop 118 is adjustable, it may permit selective adjustment of the position of the upper surface of the actuator and/or the degree to which the actuator needs to be moved from its unactuated configuration prior to braking forces being applied to the rear wheel assembly. When stop 118 is a replaceable component of the scooter, it may be selectively removed for use of the scooter without the stop and/or replaced with a differently sized or configured stop.

As discussed herein, it is within the scope of the present disclosure that the relative position of the brake member and actuator may be (but are not required to be) adjustable. For example, permitting selective adjustment of these components may permit adjustment of the position of the upper surface of the actuator without adjusting the distance between the brake member and the corresponding rear wheel(s), and vice versa. As a more specific example, at least one of the actuator, the brake member, and/or a linkage structure 114 may be selectively adjustable within a range of defined positions, such as when selectively secured within a continuous path of positions by a suitable fastening mechanism and/or when selectively installed within a selected one of a plurality of spaced-apart predefined positions. As yet a further option, when at least one of the actuator and/or brake assembly are designed to be removed and replaced from the rest of the brake assembly, the component may be replaced with a differently sized component.

Figure 6:
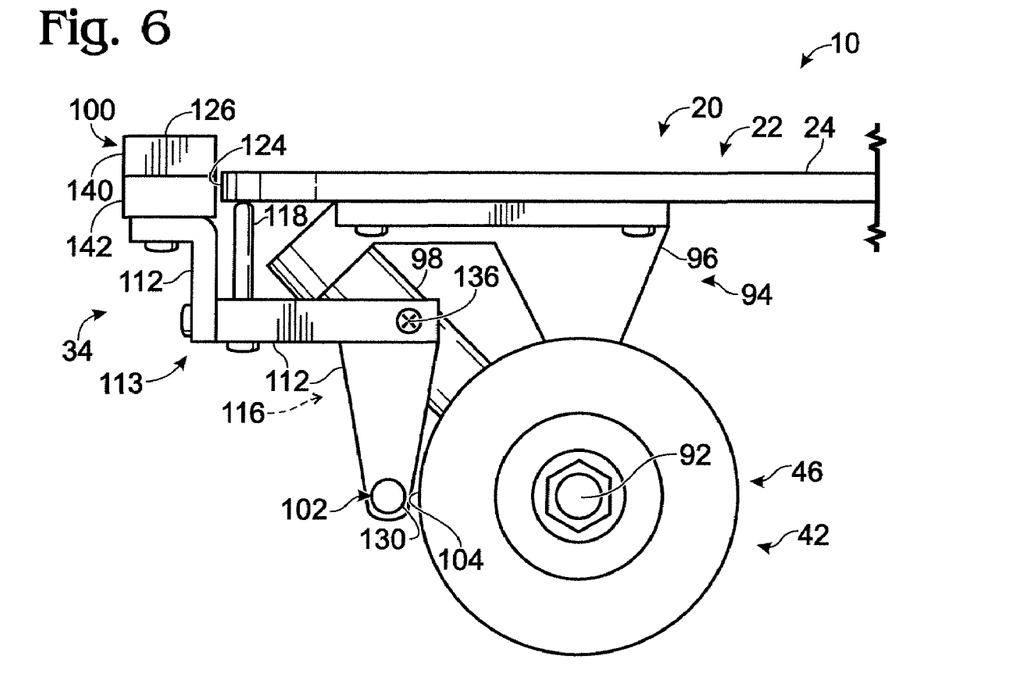
FIG. 6 is a fragmentary side elevation view of another illustrative example of a scooter with a brake assembly according to the present disclosure.

A somewhat less schematic example of a scooter with an illustrative brake assembly 34 according to the present disclosure is shown in FIG. 6 in its unactuated configuration (i.e., in its configuration when rider-imparted braking inputs are not being applied to the brake assembly's actuator). Scooter 10 is shown in fragmentary, and it is within the scope of the present disclosure that the scooter's body, wheel assembly, brake assembly, and steering assembly may include any of the structures, configurations, and variants that are described, illustrated, and/or incorporated herein. As illustrated, the scooter includes a rear wheel assembly 42 that includes a pair of wheels 46 that are rotatably and pivotally coupled to the body 20 of the scooter by a truck assembly 94 having at least a mount 96 and a pivot member, or truck chassis, 98. As discussed, the mount 96 of the truck assembly is secured in a fixed orientation relative to the body of the scooter, and the pivot member is pivotally coupled to the mount and thereby pivotally coupled to the body of the scooter. Accordingly, lateral tilting of the scooter's body during ground-traveling movement of the scooter results in pivotal movement of the pivot member and rear wheels. As discussed in more detail herein, because the brake assembly is coupled to the pivot member of the truck assembly, brake assembly 34 is configured to position the brake member in a selected orientation relative to the rear wheels of the rear wheel assembly regardless of whether the body of the scooter is laterally tilted or in its horizontal (non-tilted) orientation.

The illustrated example includes actuator 100 that is adapted to pivotally move as a unit with brake member 102, with the brake assembly including a brake assembly body, or frame, 113 to which the actuator and brake member are coupled. As discussed, the brake assembly body is pivotally coupled to pivot member 98 of truck assembly 94, such as about an axis that extends parallel, or generally parallel, to the axle assembly 92 upon which wheels 46 are rotatably mounted. In FIG. 6, the pivot axis of the brake assembly with respect to the pivot member of truck 94 is indicated at 136. The illustrated example of a brake assembly 34 shown in FIG. 6 provides a graphical example of a brake assembly with an actuator 100 whose unactuated position relative to riding surface 24 of the rider platform 22 of the scooter's body 20 is selectively adjustable. As illustrated, the actuator includes a pair of members 140 and 142 that are coupled to brake assembly body 113 to position the upper surface 126 of the actuator above the riding surface of the scooter's rider platform. One or both of the members may be selectively removed to lower the upper surface of the actuator, such as to an unactuated position that is even with the riding surface or below the riding surface.

As discussed, and while not required to all brake assemblies 34 according to the present disclosure, in some embodiments it may be desirable for the pivot axis of truck assembly 94 to intersect the upper surface of the actuator when the actuator is in at least its unactuated configuration. In at least FIG. 5, the pivot, or steering, axis of truck assembly 94 is indicated at 90. As shown, the axis intersects the upper surface 126 of actuator 100. A potential benefit of this configuration is that the relative movement of the actuator relative to the longitudinal axis of the scooter's body is minimized, or reduced, as the body is tilted to steer the scooter during ground-traveling use of the scooter. However, this relative positioning of the actuator's upper surface is not required to all embodiments. Accordingly, the distance that this upper surface is spaced-apart from the steering axis may affect the relative position of the upper surface relative to the body of the scooter as the body is tilted by a rider to provide steering inputs to the scooter's rear wheel assembly.

In FIG. 6, an illustrative example of a suitable stop 118 is shown. Stop 118 may assist in defining the unactuated position of the actuator's upper surface relative to the riding surface of the scooter's body. In the illustrated example, the stop extends from the brake assembly body and selectively engages the underside of the scooter's body to define the maximum extent to which the brake assembly may be pivoted away from the rear wheels of the rear wheel assembly, such as responsive to forces exerted by a biasing mechanism 116. Stop 118 may extend from the brake assembly body in a fixed orientation. Additionally or alternatively, stop 118 may be adjustably received through brake assembly body 113, such as with inter-engaging threads that extend from the stop and a bore through the brake assembly body.

The illustrative brake assembly of FIG. 6 includes a brake member 102 with an integral contact surface 130 that is positioned to selectively engage the ground-contacting (i.e., circumferential) surface 104 of at least one of the rear wheel assembly's rear wheels 46. When the brake assembly is in its unactuated, or idle, configuration, the brake member is maintained in a spaced-apart relationship relative to that rear wheel (s) that it is configured to selectively engage. Upon receipt of braking inputs to the actuator that pivot the actuator generally downward from the position shown in FIG. 6, the brake member is pivoted toward, and eventually, into engagement with the engagement surface to apply braking forces thereto, such as shown in FIG. 7.

Figure 7:
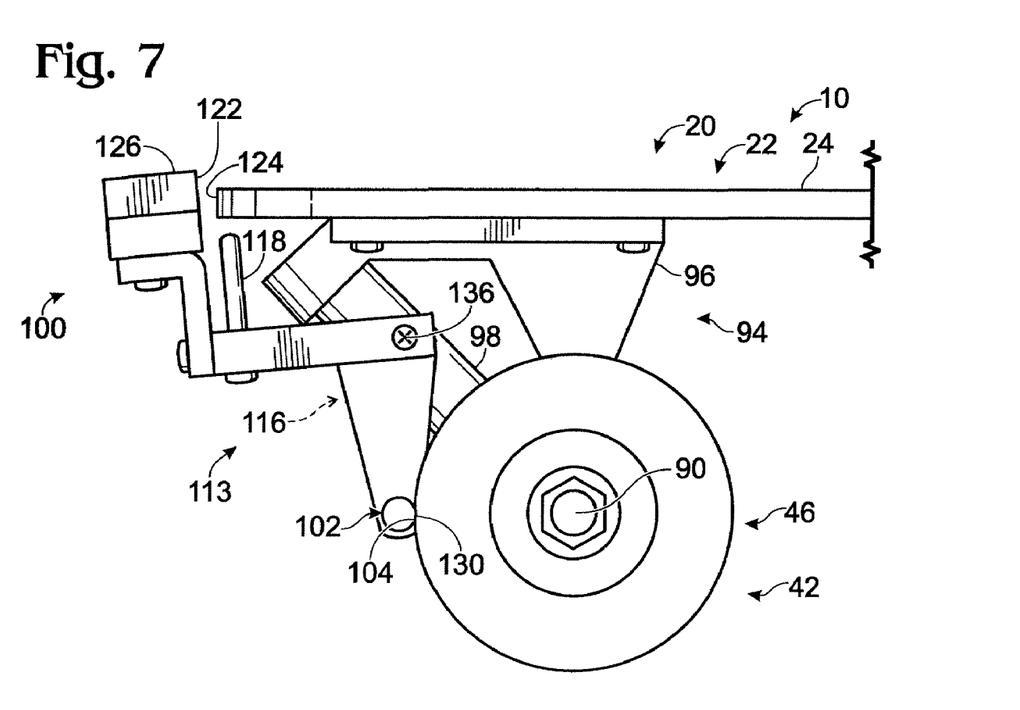
FIG. 7 is a fragmentary side elevation view of the scooter and brake assembly of FIG. 6, with the brake assembly pivoted from the unactuated configuration of FIG. 7 to a braking configuration.

In the illustrative braking configuration shown in FIG. 7, the contact surface 130 of the brake member is engaged with the engagement surface 104 of rear wheel 46 to applying braking forces thereto, with the illustrated engagement surface corresponding to the ground-contacting circumferential surface of the wheel. As discussed, the brake member is positioned so that the force of the engagement surface contacting the contact surface of the brake member urges the brake member away from the corresponding rear wheel. When the force of the braking inputs applied by the rider standing on rider platform 22 exceed these disengagement forces, then the rider-applied braking forces continue to be applied to the rear wheel. However, when the braking forces are no longer applied or are applied at less than the disengagement forces generated by the contact with the rear wheel's engagement surface, then the brake member is moved away from contact with the rear wheel.

The brake member shown in the illustrative, non-exclusive example of FIGS. 6 and 7 provides a graphical example of a brake member that is configured to engage the engagement surface of at least one of the rear wheel assembly's rear wheels in a non-binding manner. More specifically, the illustrated example depicts a brake member that is not drawn into binding contact with the rotating rear wheel when the brake assembly is actuated or otherwise urged to a braking configuration. Instead, and as discussed above, the brake member is urged away from contact with the rear wheel's engagement surface while braking forces are being applied to the wheel by the brake member. It is within the scope of the present disclosure that the contact surface of the brake member may be positioned for engagement of the engagement surface of rear wheel(s) 46 at any suitable relative location, although in many embodiments it will be desirable for this position to be selected to provide non-binding engagement. It is not a requirement to all embodiments, that the frictional force of the rotating rear wheel(s) engaging the brake member positively urges the brake member away from its braking configuration. In some embodiments, it may be desirable to position the brake member at a higher or lower position than shown in FIG. 7, (optionally, with a corresponding change in the length of the brake assembly body from which the brake member extends).

Figure 8:
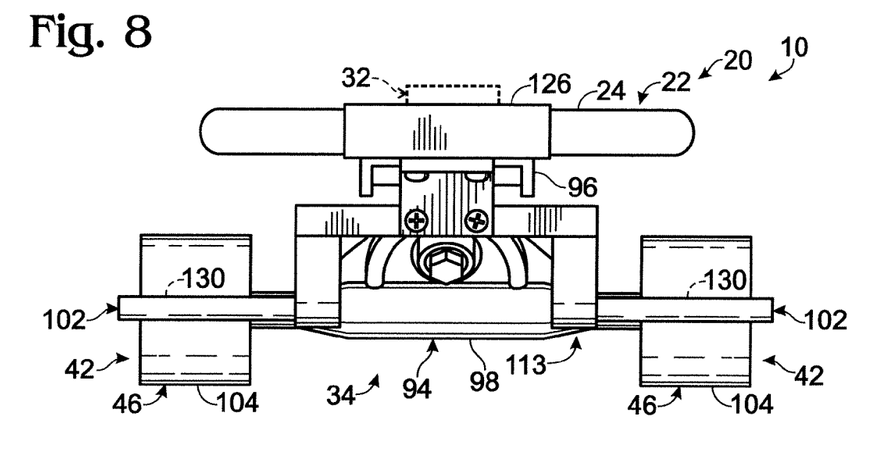
FIG. 8 is a fragmentary rear elevation view of the scooter and brake assembly of FIG. 6.

As discussed, brake assemblies 34 according to the present disclosure may include more than one brake member 102 and may be adapted to apply braking forces to more than one rear wheel 46 responsive to rider-applied braking inputs to actuator 100. FIG. 8 illustrates a brake assembly that includes a pair of brake members 102 that are respectively positioned to apply braking forces to a pair of rear wheels 46 of rear wheel assembly 42. For the purpose of simplicity, the illustrative brake assembly shown in FIG. 8 is depicted with structure that is structurally similar to the corresponding structure that was shown and described with respect to FIGS. 6 and 7. However, it is within the scope of the present disclosure that the brake assembly of FIGS. 6 and 7 may be implemented with a single brake member and/or that the brake assemblies of FIGS. 6-8 may be implemented with any of the components, elements, and/or variants that are described, illustrated and/or incorporated herein. Also illustrated in FIG. 8 are portions of the scooter's steering assembly 32, and riding surface 24 and rider platform 22 of the scooter's body.

As shown in FIG. 8, each brake member 102 is positioned to selectively apply braking forces to a respective one of the rear wheels 46 of rear wheel assembly 42. Because the brake assembly, including brake members 102, is mounted to move as a unit with the chassis, or pivot member, of truck assembly 94, the brake members each remain in a predetermined orientation relative to the corresponding rear wheel regardless of whether or not the body of the scooter is in a horizontal or tilted configuration relative to the rear wheels. When sufficient braking inputs are imparted to the actuator of the brake assembly to urge the brake members into contact with the engagement surfaces of the rear wheels, each brake member may (but is not required to) apply equal, or generally equal, braking forces to the corresponding rear wheel because the relative position of the brake members relative to the rear wheels is maintained regardless of steering inputs to the rear wheels caused by tilting of the scooter's body.

Figure 9:
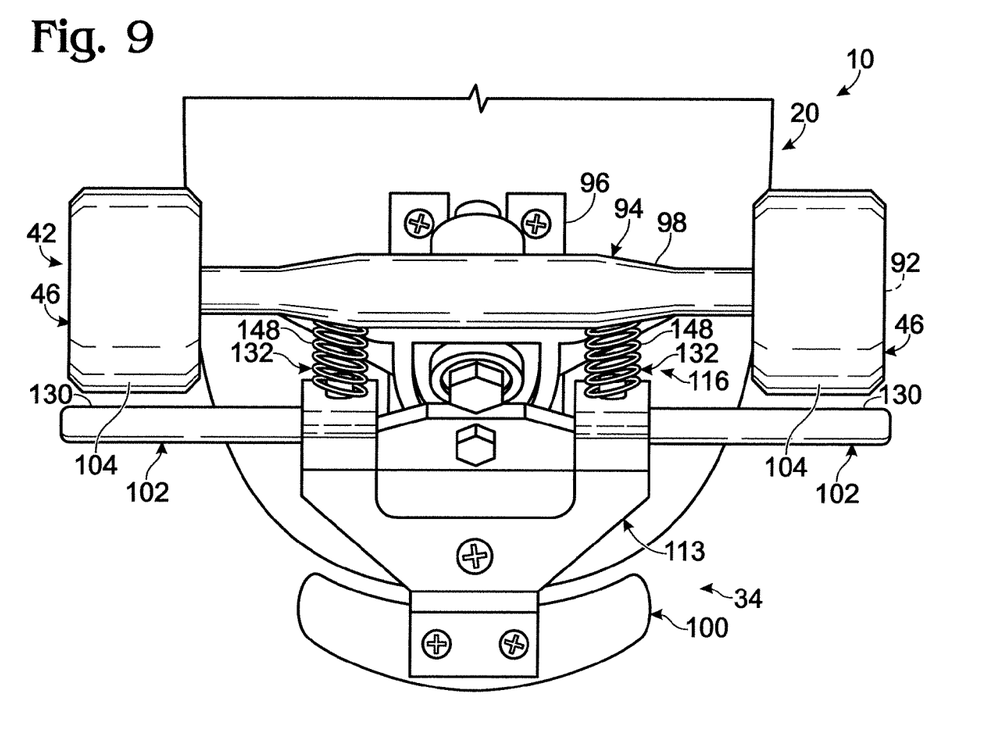
FIG. 9 is a fragmentary bottom plan view of the scooter and brake assembly of FIG. 5.

FIG. 9 provides an illustrative graphical example of a suitable biasing mechanism 116. As discussed, brake assemblies 34 according to the present disclosure may include a biasing mechanism 116 that is adapted to exert biasing forces to urge the brake assembly away from its braking configuration and generally toward its unactuated configuration. The forces exerted by the biasing mechanism may not be sufficient to cause movement of the brake assembly from its braking configuration when a rider is exerting sufficient braking inputs on the brake assembly's actuator to urge the brake member into engagement with the rear wheel assembly of the scooter. However, when the braking inputs are not being exerted or when the rider-applied forces are less than the biasing forces imparted by the biasing mechanism, then the biasing mechanism may prevent the brake member from engaging the corresponding engagement surface of the rear wheel assembly and/or may support (and/or stabilize) the brake assembly's actuator in an unactuated position relative to the rider platform of the scooter.

In FIG. 9, the brake assembly of FIG. 8 is shown with a biasing mechanism 116 that includes a pair of biasing members 132. In the illustrative example, the biasing members are depicted as coil springs 148. It is within the scope of the present disclosure that any other suitable type of biasing mechanism may be utilized, including other types of springs. Similarly, the biasing mechanism may be implemented with more or less biasing members. As an illustrative, non-exclusive example of this latter variant, one of the illustrated biasing members may optionally be omitted. The illustrated example includes biasing members that are positioned external of the truck 94 and brake assembly body 113. As shown, the biasing members extend between these components of the scooter to urge the brake assembly to pivot relative to pivot member 98 of the truck away from a braking configuration and generally toward an unactuated configuration. It is within the scope of the present disclosure that the biasing mechanism, when present, may additionally or alternatively, be at least partially, if not completely, housed or otherwise contained within at least one of brake assembly body 113 and truck 94.

Figure 10:
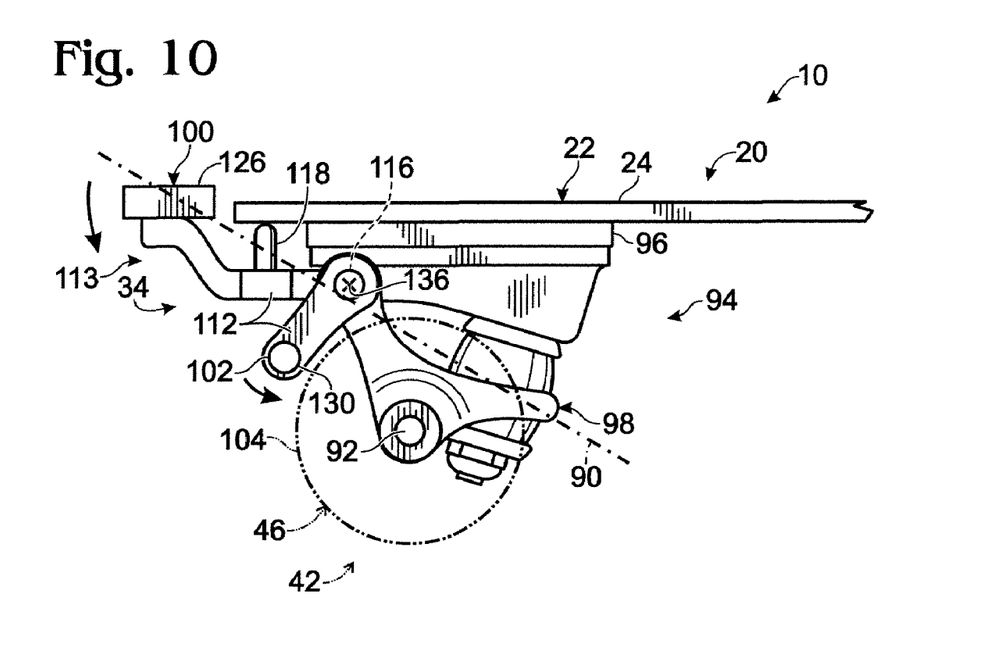
FIG. 10 is a fragmentary side elevation view of another illustrative scooter with a brake assembly according to the present disclosure.
Figure 11:
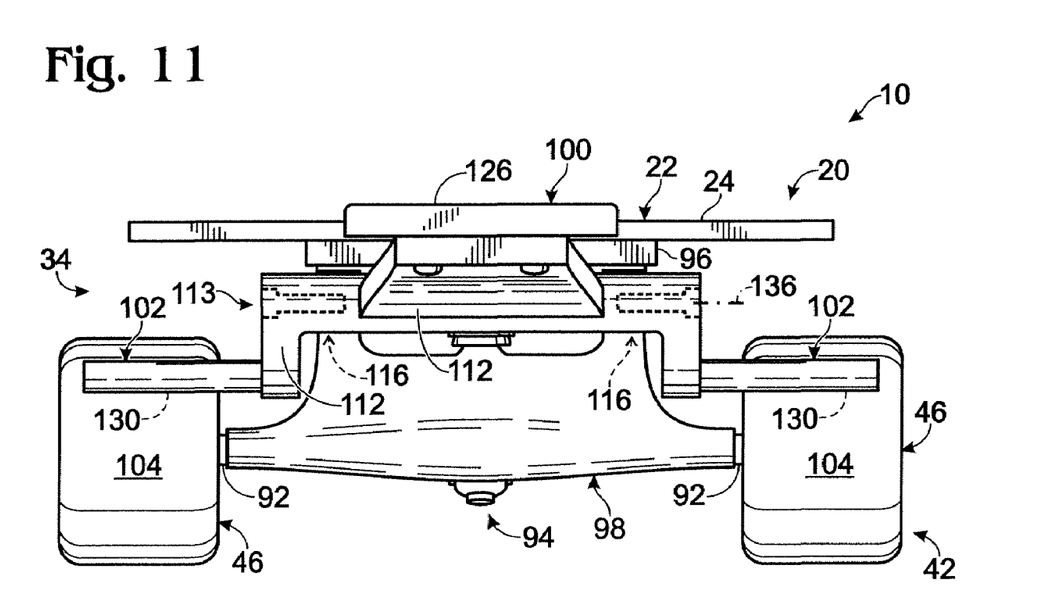
FIG. 11 is a fragmentary rear elevation view of the scooter of FIG. 10.

FIGS. 10 and 11 provide an illustrative example of a brake assembly 34 that includes such an internal biasing mechanism 116. FIGS. 10 and 11 also provide another illustrative, non-exclusive example of a suitable construction for brake assembly 34 and truck assembly 94. As shown, the upper surface 126 of actuator 100 extends slightly above the rider surface 24 of the rider platform 22 of the scooter's body 20. Rear wheels 46 have been illustrated in dashed lines in FIG. 10 to permit clearer illustration of the construction of the truck assembly and brake assembly depicted in FIG. 10. For the purpose of simplifying FIGS. 10 and 11, the scooter's steering assembly and front wheel assembly have not been illustrated. These components may have any suitable construction, such as (but not limited to) those described, illustrated and/or incorporated herein. Similarly, the illustrative examples of the components of brake assembly 34 and rear wheel assembly 42, including truck assembly 94, may also vary from the depicted illustrative constructions.

As illustrated, the brake assembly includes a pair of brake members 102 with contact surfaces 130 that are positioned to apply braking forces to engagement surfaces 104 of the rear wheels 46 of the scooter's rear wheel assembly. Similar to the illustrative example of FIGS. 6-9, the engagement surfaces are illustrated to be the circumferential ground-contacting surfaces of the rear wheels. Brake assembly 34 is pivotally coupled to the chassis, or pivot member, 98 of truck assembly 94, with a pivot axis of the brake assembly relative to chassis 98 being indicated at 136. Therefore, the brake assembly is configured to retain its orientation relative to the rear wheels of the scooter regardless of whether the body of the scooter is laterally tilted during ground-traveling use of the scooter. As previously described herein, the truck assembly includes a mount 96 that is secured in a non-pivotal orientation relative to the body of the scooter, and a chassis, or pivot member, 98 that is coupled for pivotal movement relative to the mount (and thereby relative to the body of the scooter). The rear wheels of the scooter's rear wheel assembly 42 are rotatably mounted on axles 92 that extend from the pivot member. As the body of the scooter is laterally tilted during ground-traveling use of the scooter, such as responsive to a rider standing on rider platform 22 laterally shifting the rider's weight, the body pivots about a steering, or pivot, axis 90 (indicated in FIG. 10) to impart steering inputs to the rear wheel assembly.

Responsive to rider-imparted braking inputs to actuator 100, the brake assembly pivots from the unactuated configuration that is shown in FIGS. 10 and 11 toward a braking configuration in which braking forces are imparted by brake members 102 to rear wheels 46. The brake members are configured to engage the engagement surfaces of the rear wheels in a non-binding manner, or geometry. A biasing mechanism 116 urges, or biases, the brake assembly to pivot away from engagement with the engagement surfaces of the rear wheels and to return toward the unactuated configuration. The illustrative brake assembly of FIGS. 10 and 11 also include a stop 118 (indicated in FIG. 10) that is positioned to limit the degree to which the brake assembly may pivot away from the braking configuration and/or to define the unactuated configuration of the brake assembly. The illustrated stop extends from the frame of the brake assembly and is positioned to selectively engage the underside of the body of the scooter.

In the depicted example, the brake assembly body, or frame, 113 is shown as a monolithic structure to which the actuator is coupled. As discussed, it is within the scope of the present disclosure that the actuator and/or brake member(s) 102 may be permanently or removably (and replaceably) coupled to frame 113. Removable components may permit a rider to replace components, such as if worn or damaged, and/or to interchange components, such as to adapt the brake assembly for a particular riding style, rider's preferences, wheel construction, terrain, etc.

The brake assemblies 34 described and/or illustrated herein may be utilized with a variety of wheeled vehicles. As discussed, they may be particularly well adapted for use on scooters, such as manually propelled scooters in which a rider stands upon a rider platform while operating the scooter. However, it is within the scope of the present disclosure that the brake assemblies may be utilized with other wheeled vehicles, such as skateboards and other manually propelled wheeled vehicles. This is graphically depicted in FIG. 5 in dash-dot lines, in which a front wheel assembly that includes a pair of truck-mounted front wheels is shown in dashed lines at 40. Such a separate set of truck-mounted wheels may be used, for example, with skateboards that include a brake assembly according to the present disclosure. In such an embodiment, the skateboard's steering assembly will take the form of the trucks that pivotally couple the front and rear wheels to the board, with steering of the wheels being provided by a rider tilting the skateboard's rider platform.

FIG. 5 also graphically illustrates in dashed lines at 34 that scooters 10 according to the present disclosure may optionally include a steering column 50 that extends from the body of the scooter and which is not rotatable about a generally upright, or vertical, axis to convey steering inputs to the scooter's wheels. Instead, the steering column extends from the body and terminates at a handlebar or other mechanism that is positioned to be held by a rider standing on platform 20 during ground-traveling use of the scooter, with the handlebar or other mechanism being supported in a defined position relative to the body of the scooter to provide stability and/or support to a rider standing on the scooter's rider platform. For example, the steering column may extend at a fixed, generally upright configuration relative to the body of the scooter and may not be directly coupled to the front or rear wheel assemblies except for the fact that both the steering column and wheel assemblies are connected to the body of the scooter. Although graphically illustrated in FIG. 5 along with the front wheel assembly that is shown in dash-dot lines, it is within the scope of the present disclosure that non-rotatable steering assemblies (i.e., steering assemblies or supports that are not rotatably coupled to provide steering inputs to the scooter's front wheel assembly) may be used with any suitable front wheel assembly, including a front wheel assembly that does not include a truck and/or a front wheel assembly that includes a single front wheel or more than one front wheel.

It is also within the scope of the present disclosure that such a non-rotatable steering column may (but is not required to) include an adjustment mechanism and/or a stowage assembly, such as (but not limited to) those otherwise described, illustrated, and/or incorporated herein. In FIG. 5, the optional adjustment mechanism and stowage assembly for such a non-rotatable steering column are schematically illustrated in dashed lines at 64 and 66. In some embodiments, where the scooter's steering column is not rotatably coupled to the front wheel assembly to provide steering inputs thereto responsive to rotation of the steering column relative to the body of the scooter, the steering assembly may additionally or alternatively be referred to as a handlebar assembly or a rider-support assembly. Similarly, the steering column may additionally or alternatively be referred to as a support, and the steering mechanism may additionally or alternatively be referred to as a rider-support mechanism having at least one hand grip, or handle, that is adapted to be grasped by a rider standing on the rider platform during ground-traveling use of the scooter to provide support and/or stability to the rider.

INDUSTRIAL APPLICABILITY

Scooters and other wheeled devices utilizing the brake assemblies disclosed herein are applicable to the sporting and recreational vehicle fields.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A scooter, comprising:
a body comprising a rider platform having a riding surface for supporting a standing rider;
a front wheel assembly having at least one wheel coupled for pivotal and rotational movement relative to the rider platform;
a steering assembly coupled to the front wheel assembly and adapted to transmit steering inputs from a rider standing on the rider platform to the front wheel assembly, wherein the steering assembly includes a steering mechanism and a steering column coupling the steering mechanism to the front wheel assembly;
a rear wheel assembly comprising a truck assembly and at least a pair of rear wheels coupled for pivotal and rotational movement relative to the rider platform by the truck assembly, wherein the truck assembly includes a mount that is secured in a fixed orientation relative to the rider platform, an axle assembly upon which the rear wheels are mounted, and a pivot member that pivotally couples the axle assembly to the mount for pivotal movement relative to the rider platform about a steering axis; and
a brake assembly adapted to selectively apply braking forces to the rear wheel assembly, wherein the brake assembly comprises:
an actuator extending rearward of the riding surface and adapted to receive braking inputs from a rider standing on the rider platform; and
a brake member positioned to selectively engage an engagement surface of at least one of the rear wheels to apply braking forces thereto responsive to rider-applied braking inputs to the actuator, wherein the brake assembly is pivotally coupled to the pivot member of the truck assembly and is configured to be selectively pivoted about a pivot axis between at least an unactuated configuration and a braking configuration, wherein in the unactuated configuration, the actuator is positioned to receive braking inputs from a rider standing on the rider platform and the brake member is not applying braking forces to the rear wheels, wherein the steering axis of the rear wheel assembly intersects with at least an upper surface of the actuator when the brake assembly is in the unactuated configuration, and further wherein in the braking configuration the actuator and the brake member are pivoted from the unactuated configuration and the brake assembly is applying braking forces to the rear wheel assembly.

2. The scooter of claim 1, wherein the brake member is coupled to maintain a selected orientation relative to the rear wheel assembly regardless of the pivotal orientation of the rider platform relative to the rear wheels.

3. The scooter of claim 2, wherein the brake member includes a contact surface that is positioned to selectively apply braking forces to the engagement surface of at least one of the rear wheels.

4. The scooter of claim 3, wherein the contact surface is configured to maintain a parallel orientation relative to the axle assembly regardless of the orientation of the rider platform relative to the rear wheel assembly.

5. The scooter of claim 1, wherein each rear wheel of the rear wheel assembly includes a ground-contacting surface, and further wherein the brake member includes a contact surface adapted to selectively engage the ground-contacting surface of at least one of the rear wheels of the rear wheel assembly.

6. The scooter of claim 1, wherein the brake assembly includes a pair of brake members that are respectively positioned to selectively engage the pair of rear wheels of the rear wheel assembly to apply braking forces thereto.

7. The scooter of claim 1, wherein the pivot axis of the brake assembly extends generally parallel to the axle assembly.

8. The scooter of claim 1, wherein the brake assembly includes a brake assembly body that interconnects the actuator and the brake member, and further wherein the brake assembly body is pivotally mounted to the pivot member of the truck assembly.

9. The scooter of claim 8, wherein the brake assembly body interconnects the actuator and the brake member in a fixed orientation to each other regardless of the pivotal orientation of the brake assembly relative to the rear wheels.

10. The scooter of claim 1, wherein in the unactuated configuration, the actuator is adapted to extend rearward of and not over the rider platform.

11. The scooter of claim 1, wherein the brake assembly further includes a biasing mechanism adapted to bias the brake member away from the rear wheels of the rear wheel assembly.

12. The scooter of claim 11, wherein the brake assembly further includes a stop adapted to define a maximum displacement of the brake assembly away from the rear wheel assembly.

13. The scooter of claim 1, wherein the brake member is adapted to engage the rear wheel assembly in a non-binding geometry.

14. A scooter, comprising:
a body comprising a rider platform having a riding surface for supporting a standing rider;
a front wheel assembly having at least one wheel coupled for rotational movement relative to the rider platform;
a rear wheel assembly comprising a truck assembly and at least a pair of rear wheels coupled for pivotal and rotational movement relative to the rider platform by the truck assembly, wherein the truck assembly includes a mount that is secured in a fixed orientation relative to the rider platform, an axle assembly upon which the rear wheels are mounted, and a pivot member that pivotally couples the axle assembly to the mount for pivotal movement relative to the rider platform about a steering axis; and
a brake assembly adapted to selectively apply braking forces to the rear wheel assembly, wherein the brake assembly comprises:
an actuator extending rearward of the body and adapted to receive braking inputs from a rider standing on the rider platform; and
a brake member positioned to selectively engage an engagement surface of at least one of the rear wheels to apply braking forces thereto responsive to rider-applied braking inputs to the actuator; wherein the brake member is coupled to maintain a selected orientation relative to the rear wheel assembly regardless of the pivotal orientation of the rear wheel assembly relative to the rider platform, wherein the brake assembly is coupled for movement with the axle assembly relative to the body responsive to lateral tilting of the body relative to the axle assembly, wherein the brake assembly is coupled for pivotal movement relative to the rear wheel assembly between an unactuated configuration, in which the actuator is positioned to receive braking inputs from a rider standing on the rider platform, and a braking configuration, in which the brake member is applying braking forces to the engagement surface of at least one of the rear wheels of the rear wheel assembly, and further wherein the steering axis of the rear wheel assembly intersects with at least an upper surface of the actuator when the brake assembly is in the unactuated configuration.

15. The scooter of claim 14, wherein the scooter further includes a biasing mechanism adapted to bias the brake member away from the rear wheels of the rear wheel assembly.

16. The scooter of claim 15, wherein the brake assembly further includes a stop adapted to define a maximum displacement of the brake assembly away from the rear wheel assembly.

17. The scooter of claim 14, wherein each rear wheel of the rear wheel assembly includes a ground-contacting surface, and further wherein the brake member includes a contact surface adapted to selectively engage the ground-contacting surface of at least one of the rear wheels of the rear wheel assembly.

18. The scooter of claim 14, wherein the brake assembly includes a pair of brake members that are respectively positioned to selectively engage the pair of rear wheels of the rear wheel assembly to apply braking forces thereto.

19. The scooter of claim 14, wherein the actuator does not extend over the rider platform.

20. The scooter of claim 14, wherein the scooter further comprises a steering assembly coupled to the front wheel assembly and adapted to transmit steering inputs from a rider standing on the rider platform to the front wheel assembly.

21. A scooter, comprising:
a body comprising a rider platform having a riding surface for supporting a standing rider;
a front wheel assembly having at least one wheel coupled for pivotal and rotational movement relative to the rider platform;
a steering assembly coupled to the front wheel assembly and adapted to transmit steering inputs from a rider standing on the rider platform to the front wheel assembly, wherein the steering assembly includes a steering mechanism and a steering column coupling the steering mechanism to the front wheel assembly;
a rear wheel assembly comprising a truck assembly and at least a pair of rear wheels coupled for pivotal and rotational movement relative to the rider platform by the truck assembly, wherein the truck assembly includes a mount that is secured in a fixed orientation relative to the rider platform, an axle assembly upon which the rear wheels are mounted, and a pivot member that pivotally couples the axle assembly to the mount for pivotal movement relative to the rider platform about a steering axis; and
a brake assembly adapted to selectively apply braking forces to the rear wheel assembly, wherein the brake assembly comprises:
an actuator extending rearward of the riding surface and adapted to receive braking inputs from a rider standing on the rider platform; and
a brake member positioned to selectively engage an engagement surface of at least one of the rear wheels to apply braking forces thereto responsive to rider-applied braking inputs to the actuator, wherein the brake member includes a contact surface that is positioned to selectively apply braking forces to the engagement surface of at least one of the rear wheels, wherein the brake assembly is pivotally coupled to the pivot member of the truck assembly and is configured to be selectively pivoted about a pivot axis between at least an unactuated configuration and a braking configuration, wherein in the unactuated configuration, the actuator is positioned to receive braking inputs from a rider standing on the rider platform and the brake member is not applying braking forces to the rear wheels, wherein in the braking configuration the actuator and the brake member are pivoted from the unactuated configuration and the brake assembly is applying braking forces to the rear wheel assembly, wherein the steering axis of the rear wheel assembly intersects with at least an upper surface of the actuator when the brake assembly is in the unactuated configuration; and further wherein the rider platform is unobstructed by the brake assembly.

22. The scooter of claim 21, wherein the contact surface is configured to maintain a parallel orientation relative to the axle assembly regardless of the orientation of the rider platform relative to the rear wheel assembly.

* * * * *

UNITED STATES PATENT AND TRADEMARK OFFICE
CERTIFICATE OF CORRECTION

PATENT NO. : 7,597,333 B2  Page 1 of 1
APPLICATION NO. : 11/278705
DATED : October 6, 2009
INVENTOR(S) : Scott H. Stillinger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 379 days.

Signed and Sealed this

Twenty-eighth Day of September, 2010

David J. Kappos
*Director of the United States Patent and Trademark Office*